May 10, 1966   J. W. QUYNN   3,250,351
FLUID IMPACT COUPLING AND CLUTCH
Filed Aug. 4, 1964   5 Sheets-Sheet 5

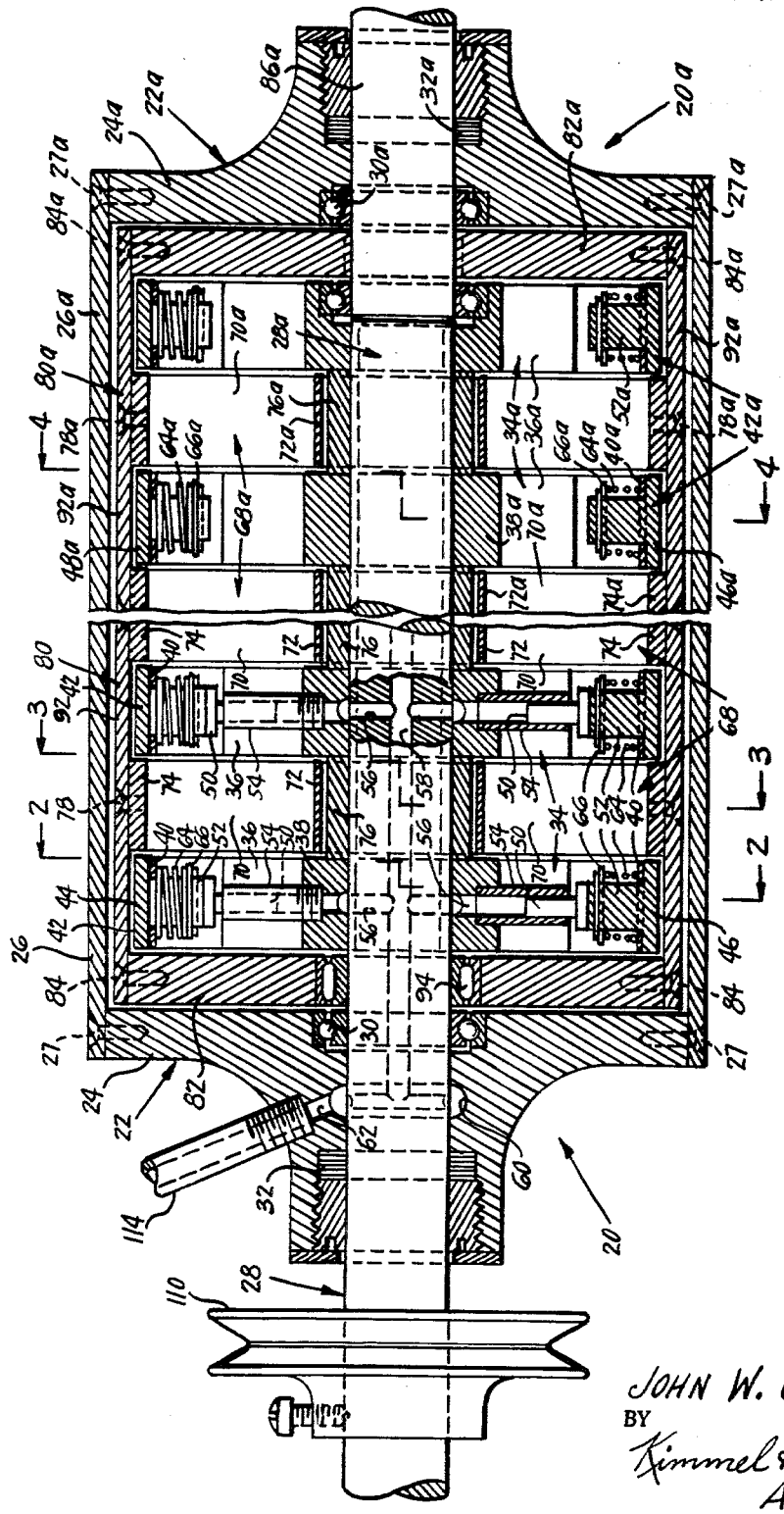

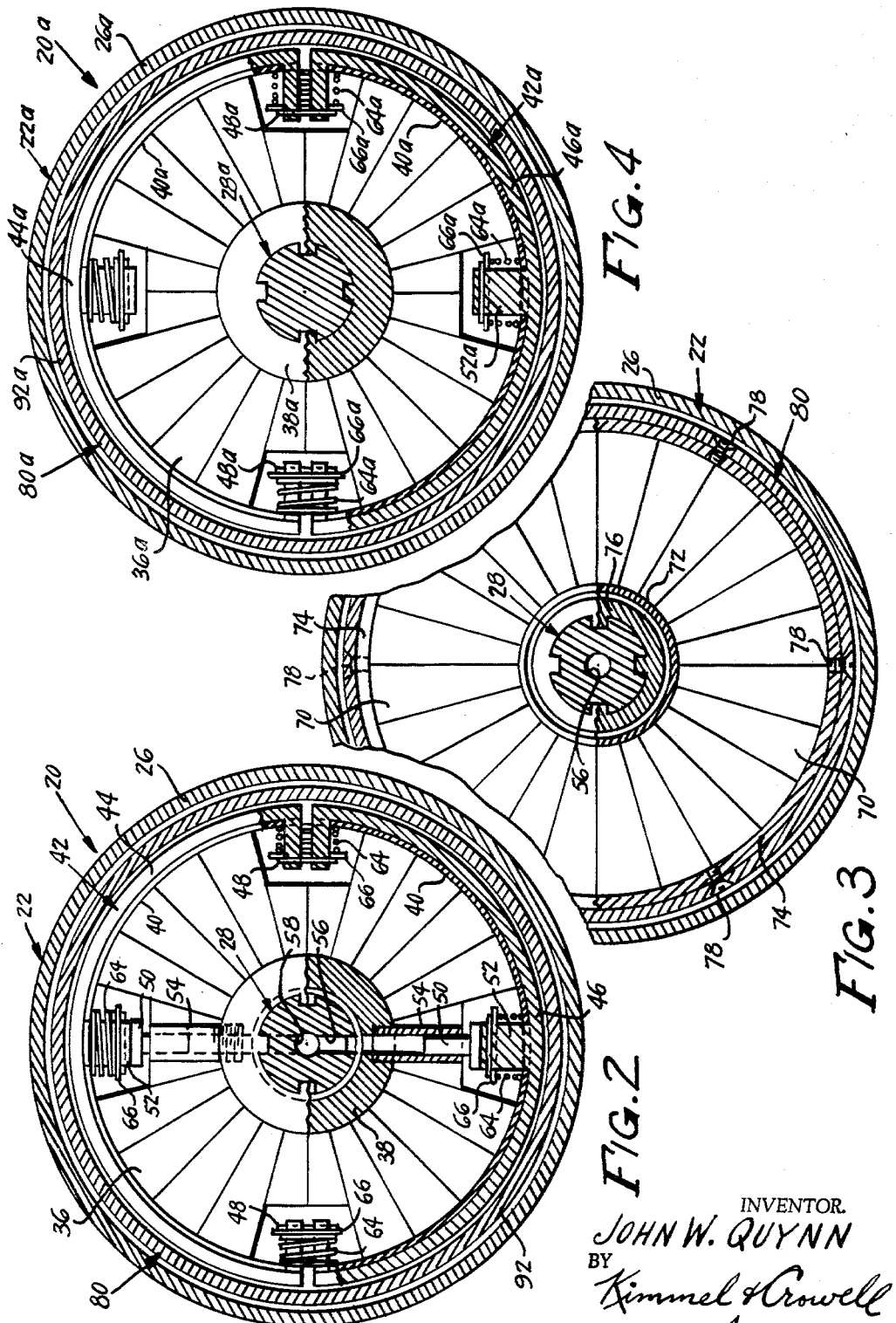

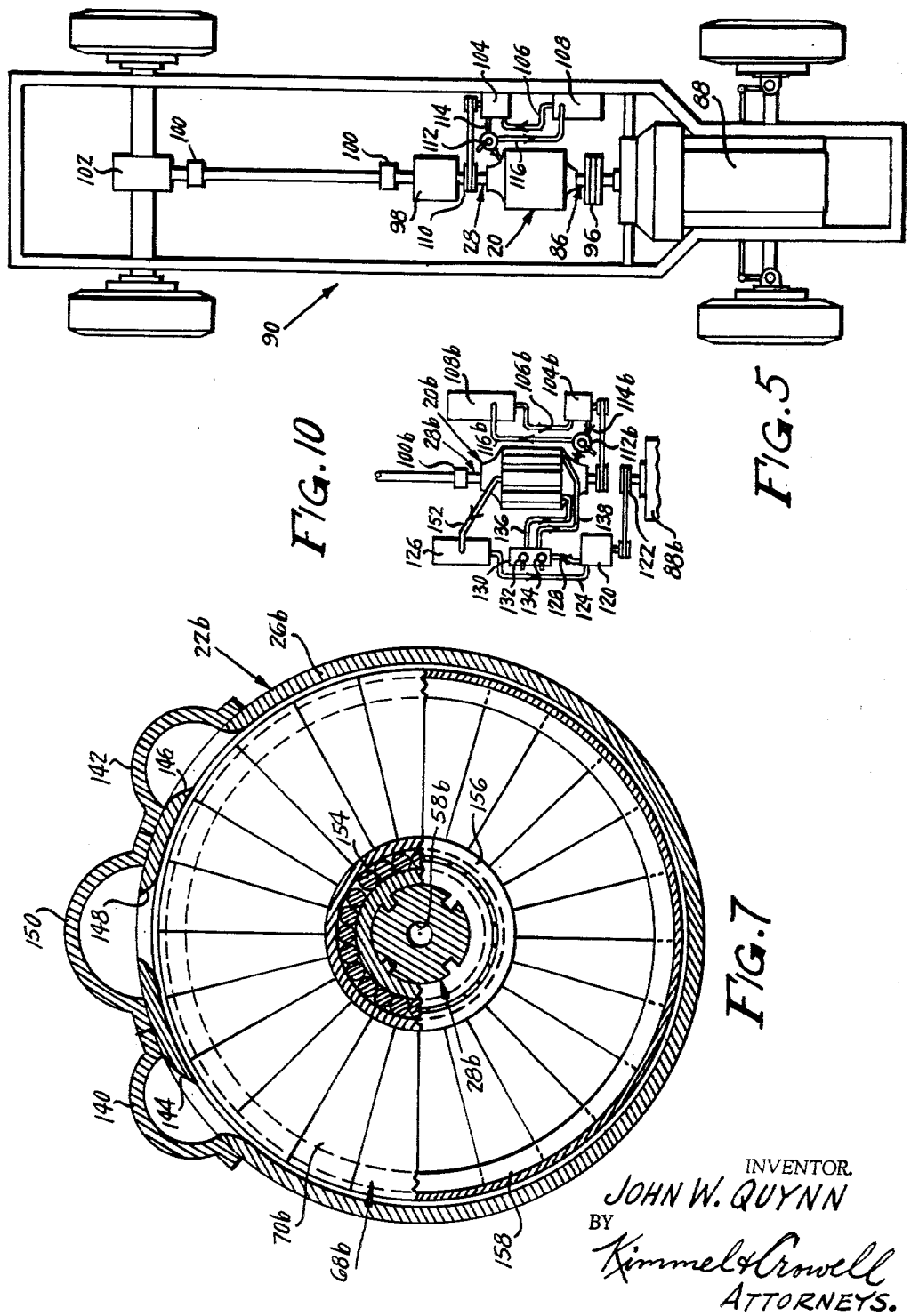

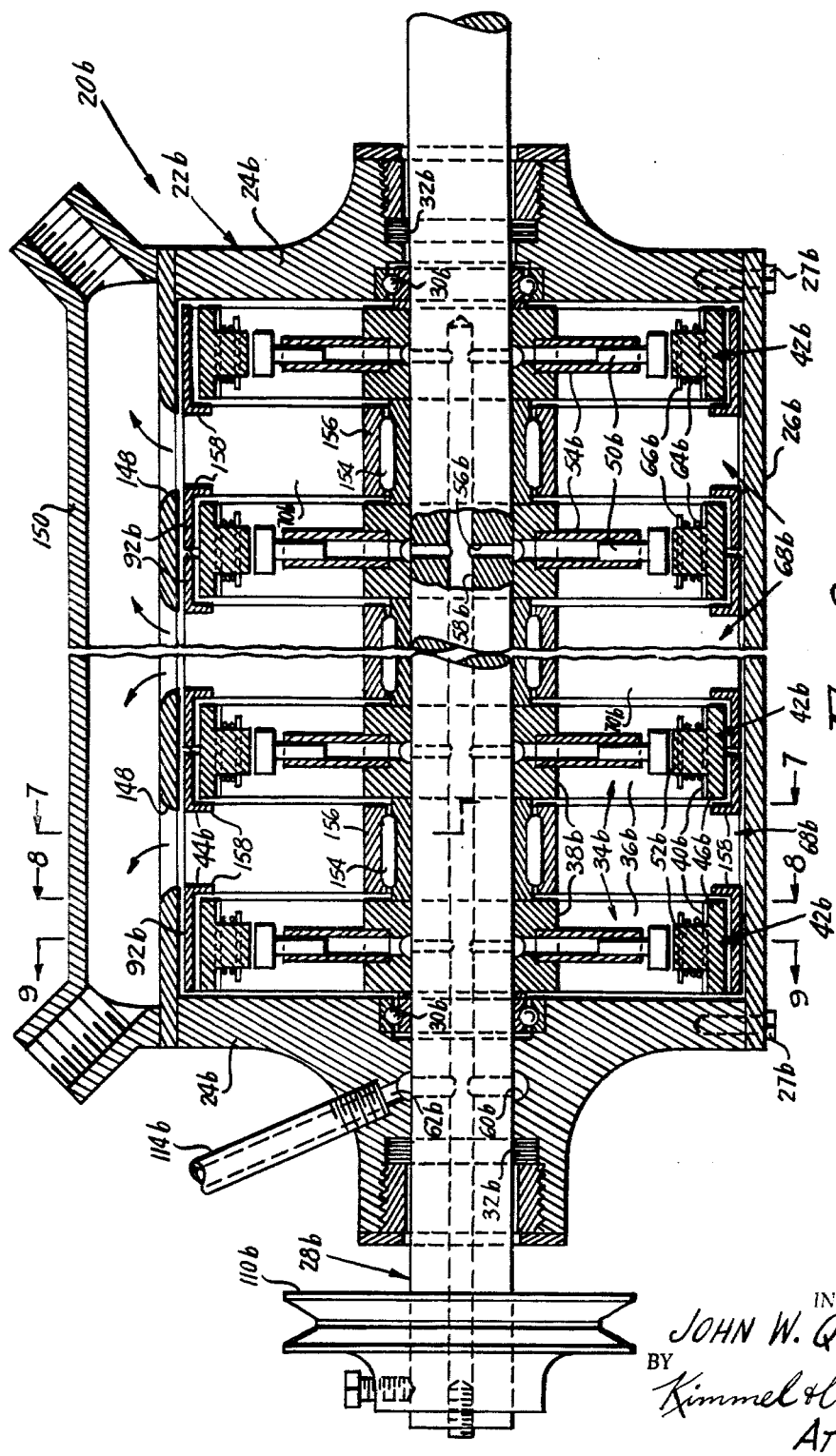

INVENTOR.
JOHN W. QUYNN
BY Kimmel & Crowell
ATTORNEYS.

United States Patent Office 3,250,351
Patented May 10, 1966

3,250,351
FLUID IMPACT COUPLING AND CLUTCH
John W. Quynn, Box 139, Frederick, Md.
Filed Aug. 4, 1964, Ser. No. 387,317
9 Claims. (Cl. 192—3.2)

This invention relates to a fluid coupling device and more particularly to a synchronous clutching means which reduces unnecessary slippage in the driving range of a hydrokinetic drive.

A primary object of this invention is the provision of a device of the type described which is sturdy and durable in construction, reliable and efficient in operation, and relatively simple and inexpensive to manufacture, utilize, and maintain.

Another object of the instant invention is to provide such a device having a plurailty of driving rotors and a plurality of alternately spaced driven rotors hydraulically coupled with means for mechanically coupling the same under predetermined circumstances.

A further object of this invention is to provide a synchronous clutching device utilizing centrifugal force, magnetic attraction, electromagnetic attraction, or hydraulic power, alone or in any combination, as an actuating means.

Still another object of the instant invention is the provision of a fluid coupling having an optional heavy duty hydraulic power pump to engage a clutching means as the speed of the device increases.

A further object of this invention is the provision of such a device with a selectively actuated dump valve for rapid unloading in emergencies.

Yet another object of the instant invention is the provision of a fluid coupling for use with standard automobile or other vehicle engines.

Another object of this invention is to provide a fluid coupling directly propelled from a vehicle engine and interposed between the engine and a conventional gear shift.

A further object of this invention is to provide such a device which is hydraulically propelled from a separate pump driven by a vehicle engine.

A still further object of the instant invention is the provision of a synchronizing clutch which is designed to correct the inherent inefficiency of fluid couplings at low speeds.

Other and further objects reside in the combination of elements, arrangements of parts, and features of construction.

Still other objects will in part be obvious and in part be pointed out as the description of the invention proceeds and as shown in the accompanying drawings wherein:

FIGURE 1 is a fragmentary cross-sectional view through a portion of one form of fluid coupling device in accordance with the instant inventive concept;

FIGURE 1A is a fragmentary cross-sectional view through a portion of a different embodiment of fluid coupling device in accordance with the instant inventive concept;

FIGURE 2 is a transverse cross-sectional view taken substantially on line 2—2 of FIGURE 1;

FIGURE 3 is a fragmentary transverse cross-sectional view taken substantially on line 3—3 of FIGURE 1;

FIGURE 4 is a transverse cross-sectional view taken substantially on line 4—4 of FIGURE 1A;

FIGURE 5 is a schematic plan view of the unit of FIGURE 1 incorporated into a conventional vehicle chassis;

FIGURE 6 is a fragmentary cross-sectional view similar to FIGURES 1 and 1A of a still further embodiment of a fluid coupling device in accordance with the instant inventive concept;

FIGURE 7 is a transverse cross-sectional view taken substantially on line 7—7 of FIGURE 6;

FIGURE 10 is a fragmentary schematic plan view of the unit of FIGURE 6 incorporated into a conventional vehicle chassis.

Similar reference characters refer to similar parts throughout the several views of the drawings.

Figure 8:
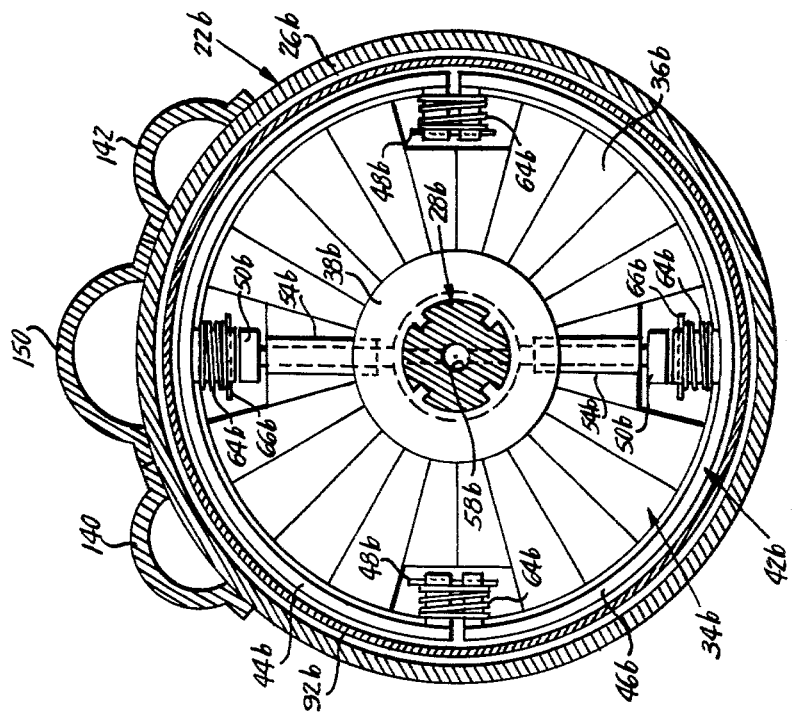
FIGURE 8 is a transverse cross-sectional view taken substantially on line 8—8 of FIGURE 6.

Referring now to the drawings, and more particularly to FIGURES 1, 2, 3 and 5, one form of fluid coupling device in accordance with the instant inventive concept is designated generally by the reference numeral 20 and includes a casing or housing 22 having oppositely disposed heads 24 (only one being shown in FIGURE 1 for illustrative convenience) and a peripheral shell 26 secured to the heads 24 in any conventional manner such as by screws or the like 27. A driven shaft 28 extends through the casing 22 and is rotatably carried in the heads 24 by ball bearings 30 with packing plugs 32 hydraulically sealing the same. A plurality of axially spaced driven rotor means 34 circumscribes the driven shaft 28 and are keyed thereto in any conventional manner for rotation therewith. Each of the driven rotor means 34 includes a plurality of radially spaced rotor blades 36 fixed between hubs 38 keyed to the driven shaft 28 and a circumferential band 40 welded to the blades 36. Each driven rotor means 34 carries a split clutch shoe means 42 comprising oppositely disposed substantially semi-circular clutch shoes 44, 46 slidably secured to each other at opposed portions by cotter pins 48 or the like. Hydraulic plungers 50 abut enlarged bosses 52 integrally formed with the individual clutches and slidingly received through the circumferential bands 40. The plungers 50 are slidingly received in cylinders 54 communicating by radial passageways 56 with an axial passageway 58 defined through the driven shaft 28 and communicating by an annular groove 60 with a hydraulic inlet 62 for a purpose to be described in more detail hereinafter. The opposite end of the axial passageway 58 (not shown) is closed. Relatively heavy spring means 64 circumscribe the bosses 52 and engage against washers or the like 66 to normally urge the clutch shoes 44, 46 inwardly toward the driven shaft 28.

A plurality of driving rotor means 68 are alternately positioned with respect to the driven rotor means 34 in circumscribing relationship with respect to the driven shaft 28. The driving rotor means 68 includes a plurality of radially spaced rotor blades 70 secured between inner and outer peripheral bands 72, 74, respectively, with spacers 76 circumscribing the driven shaft 28 to position the driving rotor means 68 which are freely rotatable around the driven shaft 28. The outer peripheral bands 74 of the driving rotor means 68 are secured as by screws 78 to portions of a driving cage 80 in the form of a cylindrical shell fixed to oppositely disposed end caps 82 (only one being shown in FIGURE 1 for illustrative convenience) by screws or the like 84. One of the end caps 82 is keyed in any conventional manner to a driving shaft 86 (not shown in FIGURE 1 for illustrative convenience; note FIGURE 5; note also FIGURE 1A to be described in more detail hereinafter for a similar showing in a modified embodiment), the driving shaft 86 being rotated by a motor means, in this embodiment the engine 88 of a conventional vehicle 90. Portions 92 of the driving cage 80 overlie the clutch shoe means 42 to define clutch ring portions extending in juxtaposition to each of the driven rotor means 34. The opposite end cap 82 of the driving cage 80 freely rotates on bearing means 94 about the driven shaft 28.

As shown particularly in FIGURE 5, the unit 20 may be interconnected in a conventional vehicle driving train with a clutch means 96 operatively securing the engine 88 to the driving shaft 86 and a conventional gear shift 98 operatively connecting the driven shaft 28 through a pair of universal joints 100 to a differential 102 in a well known manner. A power pump 104 is connected by a conduit 106 to a reservoir 108 and is driven by a pulley means 110 carried by the driven shaft 28. A three-way hydraulic dump valve 112 is interposed in the conduit 114 connected to the hydraulic inlet 62 of the device 20 and includes any conventional means for diverting a portion of the hydraulic fluid through a conduit 116 back to the reservoir 108.

The use and operation of this embodiment will now be apparent. The casing 22 is supplied with a fluid medium such as oil or the like which substantially fills the spaces between the blades of the driven rotor means 34 and the driving rotor means 68. As the driving shaft 86 is rotated through the clutch 96 by the engine 88 or any other conventional motor means, the driving cage 80 keyed thereto is also rotated which in turn drives the driving rotor means 68 to agitate the fluid medium within the casing 22. As the speed increases the fluid medium hydraulically couples the driven rotor means 34 to the driving rotor means 68 whereby the driven shaft 28 is rotated to actuate the power pump 104 by driving the pulley means 110. Hydraulic fluid is fed from the reservoir 108 through the conduit 106 and the power pump 104 to the conduit 114 and through the dump valve 112 to the hydraulic inlet 62 of the device 20. As the hydraulic fluid is received through the inlet 62 it passes from the groove 60 through the axial passageway 58 to each of the radial passageways 56 wherein it actuates the pistons 50 to expand the separate halves of the clutch shoe means 42 against the urging of the spring means 64 into contact with the clutch ring portions 92 of the driving cage 80 thereby synchronizing the driven and driving rotor means to reduce unnecessary slippage in the driving range. Any conventional relief means may be included in the dump valve 112 to allow a portion of the fluid medium to be diverted through the conduit 116 back to the reservoir 108 in the event the pressure behind the pistons 50 becomes excessive. The dump valve 112 may be actuated in any conventional manner by the driver of the vehicle to return to the maximum or starting power by releasing the clutch shoe means 42 diverting the fluid medium from the power pump 104 back to the reservoir 108 through the bypass conduit 116. The spring means 64 withdraws the clutch shoe means 42 from contact with the clutch ring portions 92 of the driving cage 80 overcoming any centrifugal force still tending to expand the clutch shoe means. Thus, the external power to the clutch shoe means can be unloaded immediately if the engine starts to labor on a grade or if emergency speed in passing is required.

Referring now particularly to FIGURES 1A and 4, a modified embodiment of the fluid coupling device of the instant invention is shown wherein parts similar to the embodiment of FIGURE 1 are designated by like reference characters followed by the suffix "a." This embodiment is actuated by a combination of centrifugal force and magnetic attraction to synchronize the driven and driving rotor means 34a, 68a, respectively. No hydraulically actuated clutch shoe means are provided as in the previous embodiment. In this modification the individual clutch shoes 44a, 46a are magnetic and at least the clutch ring portions 92a of the driving cage 80a are formed of a ferrous material such as steel or the like to attract the clutch shoe means 42a. The spring means 64a are sufficiently strong to normally maintain the clutch shoe means 42a out of contact with the clutch ring portions 92a of the driving cage 80a. However, upon rotation of the driven rotor means 34a by fluid coupling with the driving rotor means 68a, a centrifugal force is developed which expands the clutch shoe means 42a decreasing the space between the same and the clutch ring portions 92a of the driving cage 80 whereby the combination of centrifugal force and magnetic attraction actuates the clutch shoe means 42a to synchronously drive the driven shaft 28a from the driving shaft 86a. The only manner in which the synchronization of this embodiment may be broken is to reduce the speed of the driving shaft 86a sufficiently that the centrifugal force in combination with the magnetic attraction is no longer greater than the force of the spring means 64a whereby he clutch shoe means 42a are retracted and only a fluid coupling exists between the driven and driving rotor means 34a, 68a, respectively.

Figure 9:
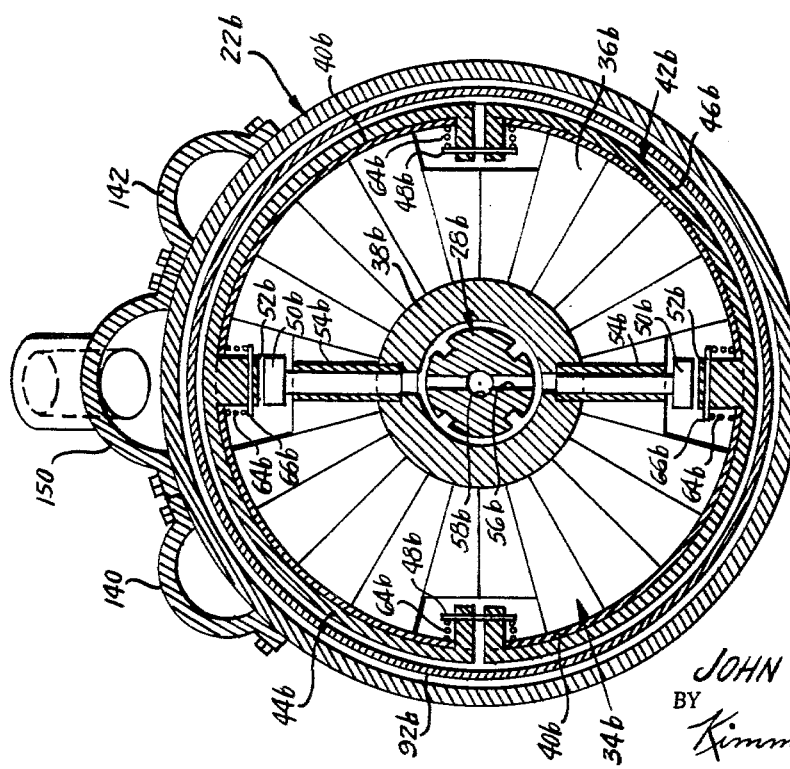
FIGURE 9 is a transverse cross-sectional view taken substantially on line 9—9 of FIGURE 6.

In the previously described embodiments, the propelling means for rotating the driving rotor means has been a direct shaft coupling through a clutch to the engine of a vehicle or the like. Referring now to the embodiment of FIGURES 6 to 10 wherein parts similar to the previous embodiments are designated by like reference characters followed by the suffix "b," the propelling means includes a propelling pump 120 connected by a pulley means 122 to the engine 88b, the propelling pump 120 receiving a fluid material through a conduit 124 from a separate reservoir 126 and feeding the same through a conduit 128 to a manifold 130 having forward and reverse valve means 132, 134, respectively, whereby the fluid material may be selectively directed in any conventional manner through forward and reverse conduits 136, 138, respectively, into forward and reverse intake caps 140, 142, respectively, communicating by openings 144, 146 in the casing 22b with opposite sides of the driving rotor means 68b to rotate the same in a selected direction. The fluid is returned through openings 148 in the casing 22b to a return cap 150 from which it passes via conduit 152 back to the reservoir 126.

In this embodiment the driving rotor means 68b are free running and include bearing means 154 rotatably carrying hubs 156 of the same in circumscribing relationship with respect to the driven shaft 28b. Of course, there is no shaft comparable to the driving shaft of the previous embodiments since the driving rotor means in this embodiment are hydraulically actuated. Since there is no driving shaft, provision must be made for rotating the driving cage which in this instance is formed of angular elements 158 secured to the driving rotor blades 70b and having clutch ring portions 92b extending over the clutch shoe means 42b to synchronously engage the driven and driving rotor means 34b, 68b in a manner similar to the previous embodiments upon introduction of fluid material from the power pump 104b as explained hereinabove. The clutch 96 and gear shift 98 are dispensed with in this embodiment in view of the modified propelling means.

While the above description has been directed particularly to the utilization of magnetic attraction in combination with centrifugal force and hydraulically actuated means for synchronizing the driven and driving rotor means to reduce slippage, it will be readily understood that other comparable means such as electro-magnetic means may be substituted therefor, if desired. For example, under heavy duty conditions the clutch shoe means may be selectively electrically magnetized to overcome the force of the spring means and engage the same against the clutch ring portion of the driving cage with a switch being utilized in a manner comparable to the dump valve to quickly release the clutch shoe means when necessary.

It will now be seen that there is herein provided an improved fluid coupling device which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is

I claim:

1. A fluid coupling device comprising a casing, a driven shaft extending through said casing, at least one driven rotor means circumscribing and keyed to said driven shaft within said casing, at least one driving rotor means circumscribing and freely rotatable with respect to said driven shaft and positioned adjacent said driven rotor means within said casing, propelling means external to said casing and operatively connected to said driving rotor means to rotate the same with respect to said driven shaft, a fluid medium filling said casing and hydraulically coupling said driving and said driven rotor means, a driving cage secured to each of said driving rotor means for rotation therewith and having clutch ring portions extending in juxtaposition to each of said driven rotor means, clutch shoe means carried by each of said driven rotor means, spring means normally urging said clutch shoe means out of contact with said clutch ring portions of said driving cage, actuating means operatively connected to said clutch shoe means to overcome said spring means and engage said clutch shoe means with said clutch ring portions of said driving cage to synchronize said driving and driven rotor means, a plurality of driven rotor means axially spaced on said driven shaft, and a plurality of driving rotor means alternately positioned with respect to said driven rotor means, said clutch shoe means being actuated by centrifugal force on reaching a predetermined speed of rotation of said driven rotor means to overcome said spring means and engage said clutch shoe means with said clutch ring portions of said driving cage.

2. The structure of claim 1 wherein said clutch shoe means are magnetic, said clutch ring portions of said driving cage being formed of a ferrous material, said clutch shoe means being actuated by a combination of centrifugal force and magnetic attraction to overcome said spring means.

3. A fluid coupling device comprising a casing, a driven shaft extending through said casing, at least one driven rotor means circumscribing and keyed to said driven shaft within said casing, at least one driving rotor means circumscribing and freely rotatable with respect to said driven shaft and positioned adjacent said driven rotor means within said casing, propelling means external to said casing and operatively connected to said driving rotor means to rotate the same with respect to said driven shaft, a fluid medium filling said casing and hydraulically coupling said driving and said driven rotor means, a driving cage secured to each of said driving rotor means for rotation therewith and having clutch ring portions extending in juxtaposition to each of said driven rotor means, clutch shoe means carried by each of said driven rotor means, spring means normally urging said clutch shoe means out of contact with said clutch ring portions of said driving cage, actuating means operatively connected to said clutch shoe means to overcome said spring means and engage said clutch shoe means with said clutch ring portions of said driving cage to synchronize said driving and driven rotor means, said actuating means including a power pump means, hydraulic means operatively interconnecting said power pump means with said clutch shoe means to overcome said spring means and engage said clutch shoe means with said clutch ring portions of said driving cage, means to drive said power pump means, and a dump valve interposed in said hydraulic means, said dump valve being operable to divert hydraulic fluid from said power pump means away from said clutch shoe means under heavy duty.

4. A fluid coupling device comprising a casing, a driven shaft extending through said casing, at least one driven rotor means circumscribing and keyed to said driven shaft within said casing, at least one driving rotor means circumscribing and freely rotatable with respect to said driven shaft and positioned adjacent said driven rotor means within said casing, propelling means external to said casing and operatively connected to said driving rotor means to rotate the same with respect to said driven shaft, a fluid medium filling said casing and hydraulically coupling said driving and said driven rotor means, a driving cage secured to each of said driving rotor means for rotation therewith and having clutch ring portions extending in juxtaposition to each of said driven rotor means, clutch shoe means carried by each of said driven rotor means, spring means normally urging said clutch shoe means out of contact with said clutch ring portions of said driving cage, actuating means operatively connected to said clutch shoe means to overcome said spring means and engage said clutch shoe means with said clutch ring portions of said driving cage to synchronize said driving and driven rotor means, said actuating means including a power pump means, hydraulic means operatively interconnecting said power pump means with said clutch shoe means to overcome said spring means and engage said clutch shoe means with said clutch ring portions of said driving cage, means to drive said power pump means, and said means to drive said power pump means includes pulley means operatively interconnecting said driven shaft and said power pump means.

5. A fluid coupling device comprising a casing, a driven shaft extending through said casing, at least one driven rotor means circumscribing and keyed to said driven shaft within said casing, at least one driving rotor means circumscribing and freely rotatable with respect to said driven shaft and positioned adjacent said driven rotor means within said casing, propelling means external to said casing and operatively connected to said driving rotor means to rotate the same with respect to said driven shaft, a fluid medium filling said casing and hydraulically coupling said driving and said driven rotor means, a driving cage secured to each of said driving rotor means for rotation therewith and having clutch ring portions extending in juxtaposition to each of said driven rotor means, clutch shoe means carried by each of said driven rotor means, spring means normally urging said clutch shoe means out of contact with said clutch ring portions of said driving cage, actuating means operatively connected to said clutch shoe means to overcome said spring means and engage said clutch shoe means with said clutch ring portions of said driving cage to synchronize said driving and driven rotor means, said propelling means including a motor means and a driving shaft rotated by said motor means, said driving cage being secured to said driving shaft for rotation therewith, and said driving rotor means being secured to said driving cage.

6. The structure of claim 5 wherein said motor means is a vehicle engine.

7. A fluid coupling device comprising a casing, a driven shaft extending through said casing, at least one driven rotor means circumscribing and keyed to said driven shaft within said casing, at least one driving rotor means circumscribing and freely rotatable with respect to said driven shaft and positioned adjacent said driven rotor means within said casing, propelling means external to said casing and operatively connected to said driving rotor means to rotate the same with respect to said driven shaft, a fluid medium filling said casing and hydraulically coupling said driving and said driven rotor means, a driving cage secured to each of said driving rotor means for rotation therewith and having clutch ring portions extending in juxtaposition to each of said driven rotor means, clutch shoe means carried by each of said driven rotor means, spring means normally urging said clutch shoe means out of contact with said clutch ring portions of said driving cage, actuating means operatively connected to said clutch shoe means to overcome said spring means and engage said clutch shoe means with said clutch ring portions of said driving cage to synchronize said driving and driven rotor means, said propelling means including a propelling pump, bearing means supporting said driving rotor means in circumscribing relation with respect to said driven shaft for free rotation thereabout, and hydraulic means operatively interconnecting said propelling pump with said driving rotor means to rotate said driving rotor means, and means to drive said propelling pump.

8. The structure of claim 7 wherein said means to drive said propelling pump includes a vehicle engine, and pulley means interconnecting said engine with said propelling pump.

9. The structure of claim 7 further including a manifold interposed in said hydraulic means, forward and reverse conduits connecting said manifold to opposed sides of said driving rotor means, and directing means to selectively divert hydraulic fluid from said propelling pump to said forward and reverse conduits.

References Cited by the Examiner
UNITED STATES PATENTS

| | | | |
|---|---|---|---|
| 2,244,207 | 6/1941 | Lorton | 192—57 |
| 2,642,167 | 6/1953 | Brown | 192—3.2 |

DAVID J. WILLIAMOWSKY, *Primary Examiner.*

A. T. McKEON, *Assistant Examiner.*